United States Patent
Ono et al.

(10) Patent No.: US 7,672,214 B2
(45) Date of Patent: Mar. 2, 2010

(54) PROBE, RECORDING APPARATUS, REPRODUCING APPARATUS, AND RECORDING/REPRODUCING APPARATUS

(75) Inventors: Takahito Ono, Miyagi (JP); Takanori Maeda, Saitama (JP); Atsushi Onoe, Saitama (JP); Hirokazu Takahashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 707 days.

(21) Appl. No.: 11/629,203

(22) PCT Filed: Jun. 14, 2005

(86) PCT No.: PCT/JP2005/010884

§ 371 (c)(1),
(2), (4) Date: Jan. 8, 2007

(87) PCT Pub. No.: WO2005/124758

PCT Pub. Date: Dec. 29, 2005

(65) Prior Publication Data

US 2008/0043598 A1 Feb. 21, 2008

(30) Foreign Application Priority Data

Jun. 16, 2004 (JP) .............................. 2004-178612

(51) Int. Cl.
*G11B 9/00* (2006.01)
(52) U.S. Cl. ..................................... 369/126
(58) Field of Classification Search ....................... None
See application file for complete search history.

(56) References Cited

U.S. PATENT DOCUMENTS

| 5,094,975 | A | 3/1992 | Siu |
| 6,262,962 | B1 | 7/2001 | Aratani |
| 2004/0105373 | A1 | 6/2004 | Maeda et al. |

FOREIGN PATENT DOCUMENTS

| EP | 1 061 510 A | 12/2000 |
| EP | 1 422 707 A | 5/2004 |
| JP | 55-150144 | 11/1980 |
| JP | 07 121916 A | 5/1995 |
| JP | 8-189931 | 7/1996 |
| JP | 2002014027 A * | 1/2002 |
| JP | 2003-85969 | 3/2003 |
| JP | 2004-28853 | 1/2004 |
| JP | 2004046929 A * | 2/2004 |
| WO | WO 00/19494 A | 4/2000 |

* cited by examiner

*Primary Examiner*—Joseph H Feild
*Assistant Examiner*—Tawfik Goma
(74) *Attorney, Agent, or Firm*—Nixon & Vanderhye, P.C.

(57) ABSTRACT

A probe (100) is provided with: a substrate (110) having a surface facing a medium (20); and a point electrode (120), formed in the substrate, for performing at least one of detection operation of a state of a domain of the medium and change operation of the state of the domain of the medium, a tip portion, which is an edge portion on a side facing the medium, out of the point electrode being disposed in one point in a plane which is formed in a vicinity of an area portion in which the point electrode is formed by the surface.

20 Claims, 12 Drawing Sheets

[FIG. 1]
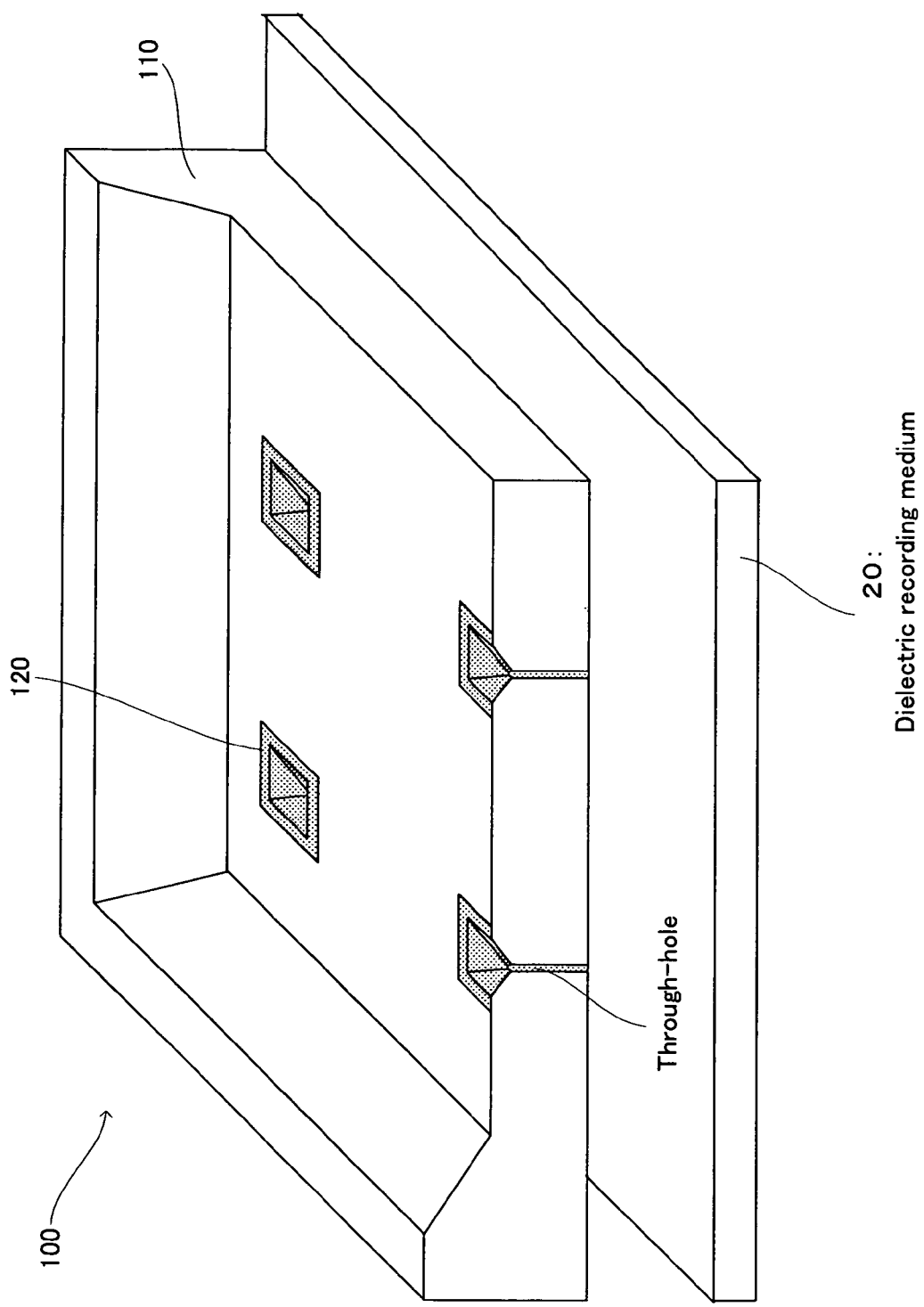

[FIG. 2]
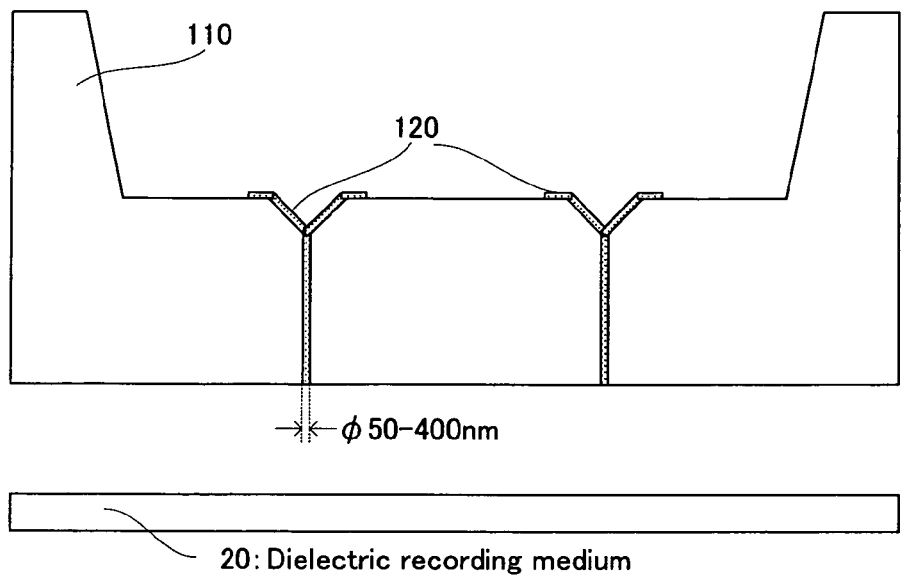
(a)
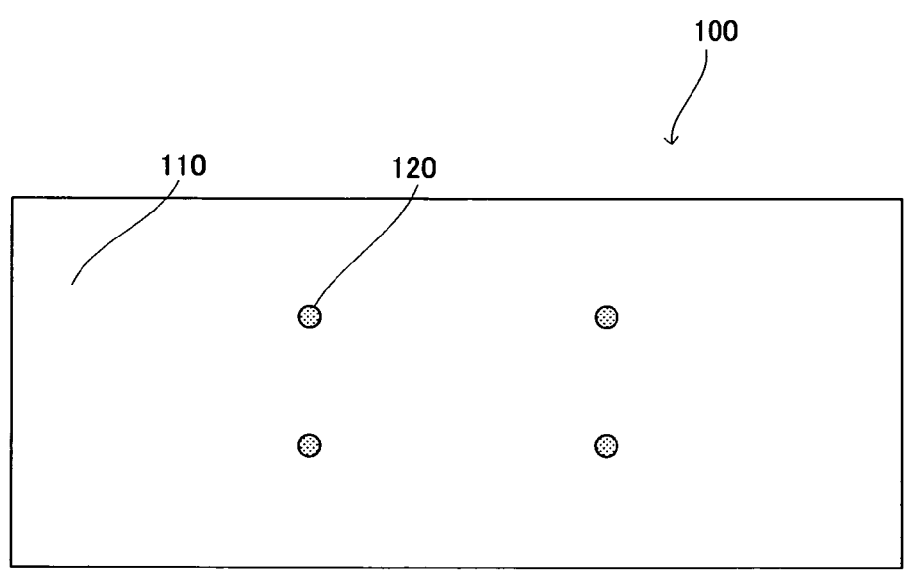
(b)

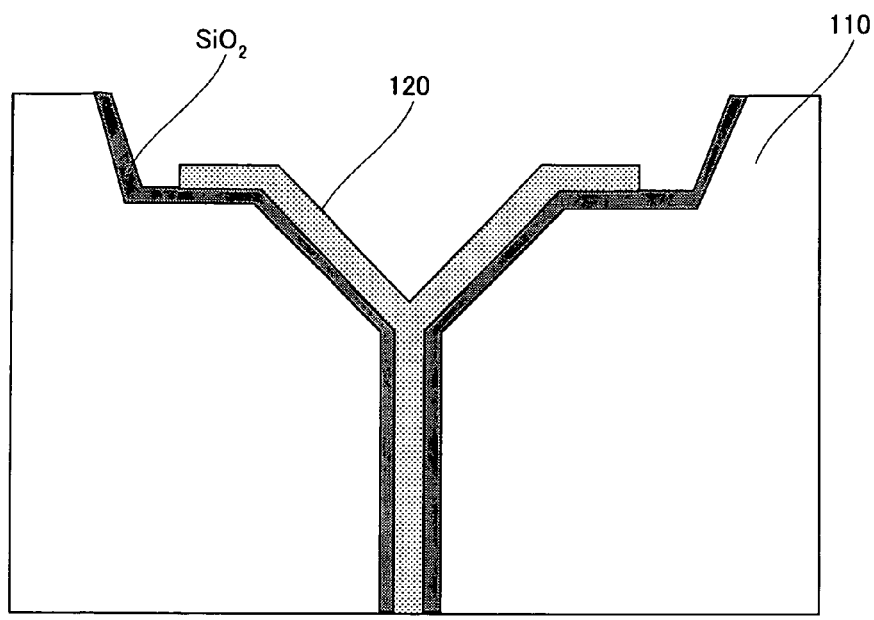
[FIG. 3]

[FIG. 4]
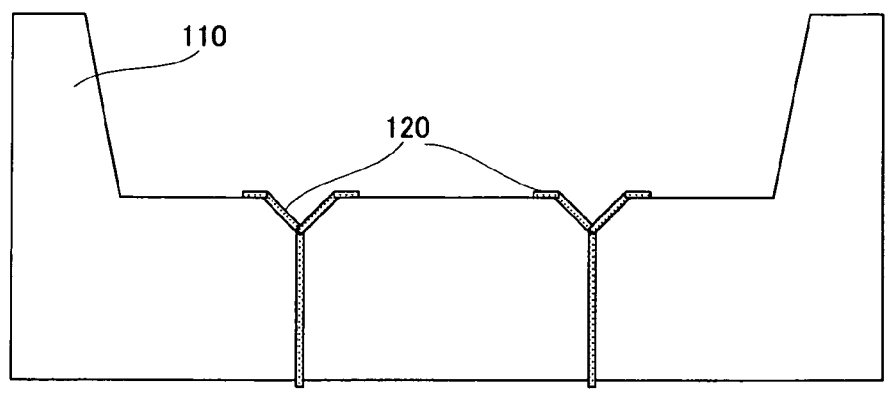
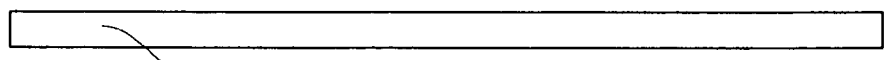
(a)
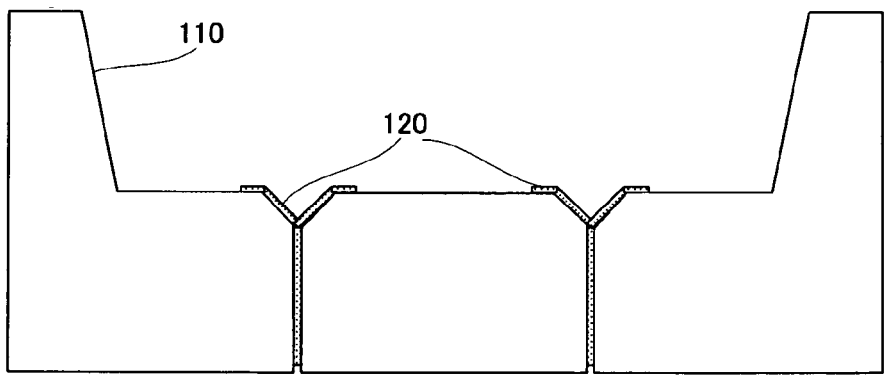
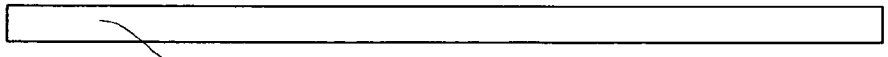
(b)

[FIG. 5]
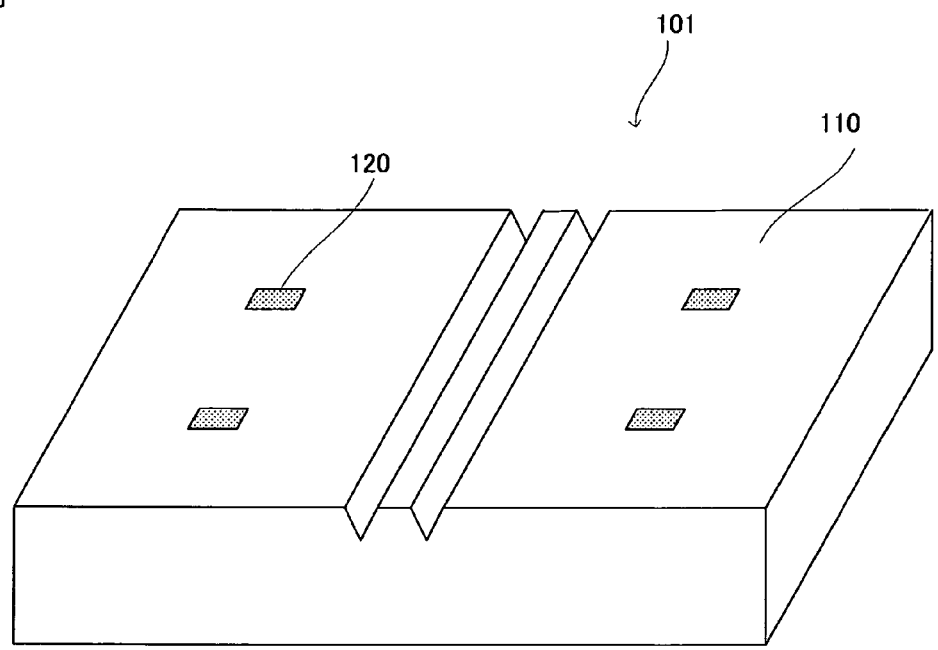
[FIG. 6]
[FIG. 7]
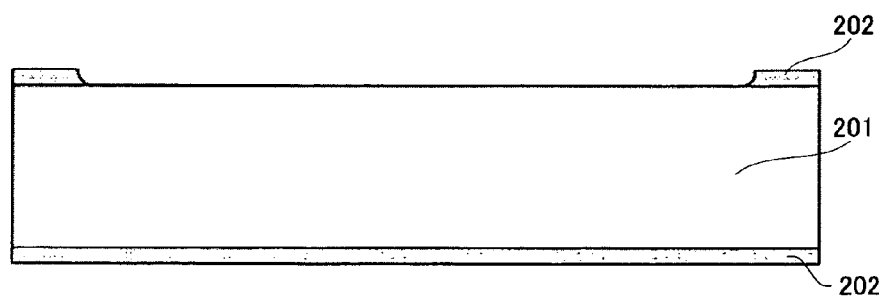

[FIG. 8]
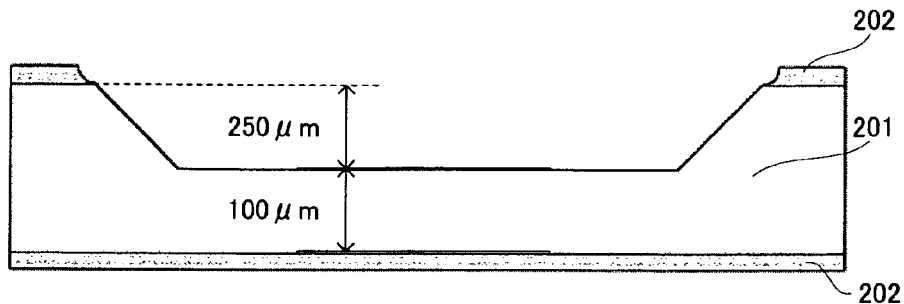
[FIG. 9]
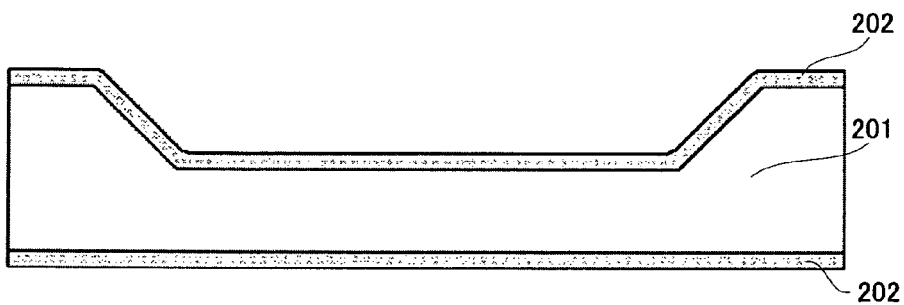
[FIG. 10]
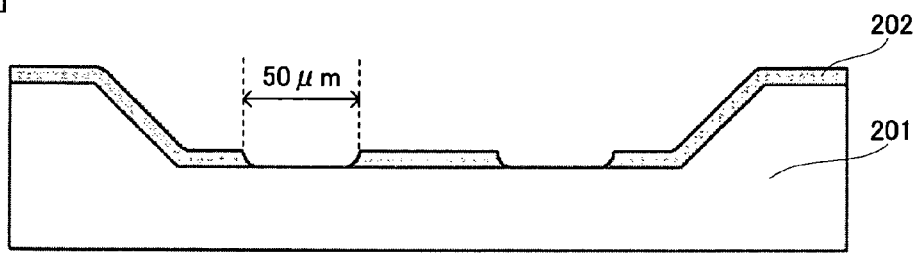
[FIG. 11]
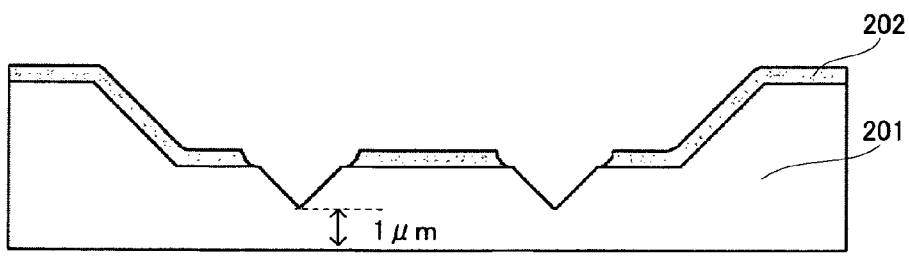

[FIG. 12]
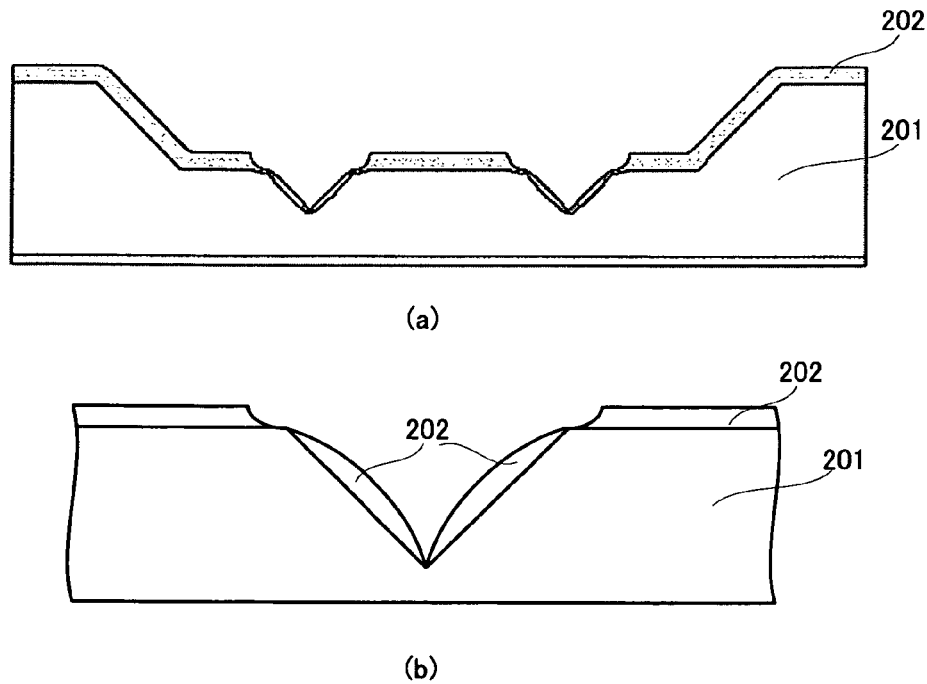
(a)
(b)
[FIG. 13]
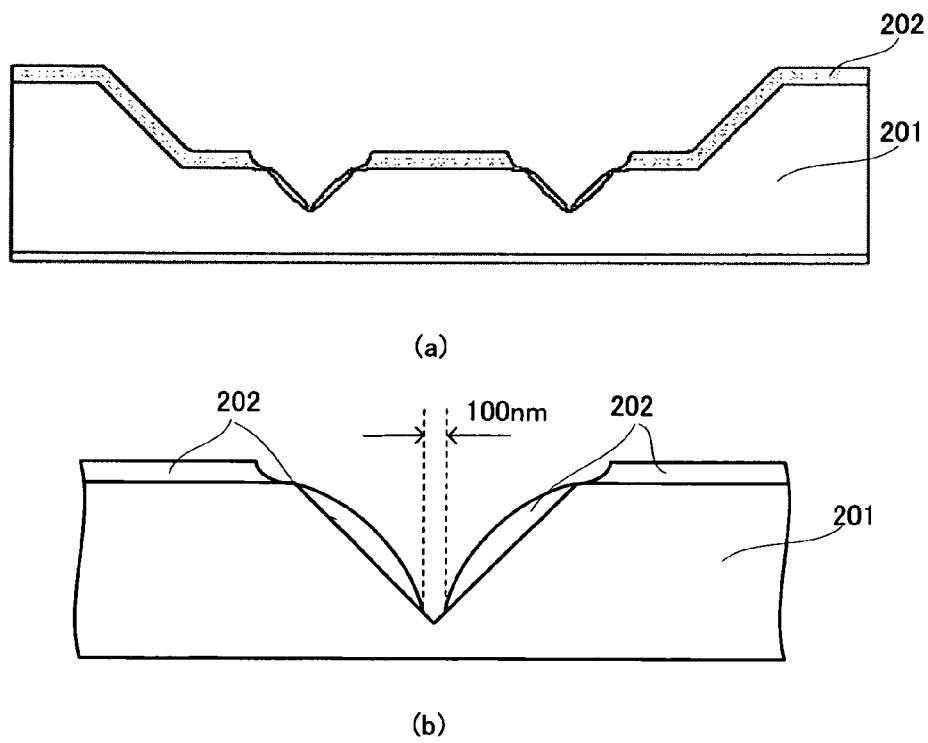
(a)
(b)

[FIG. 14]
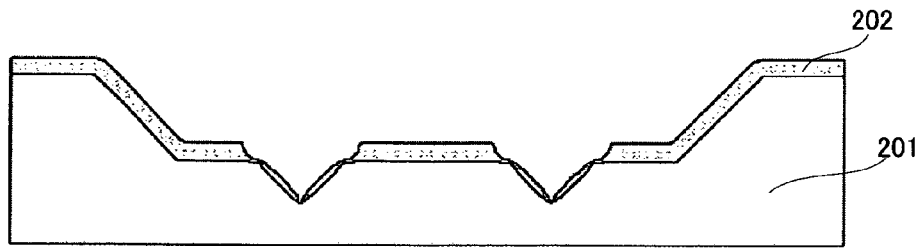
[FIG. 15]
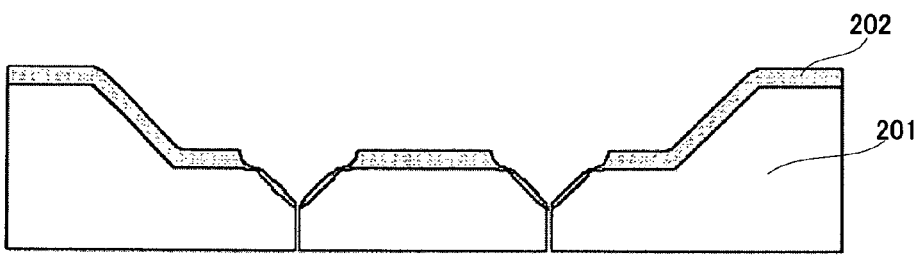
[FIG. 16]
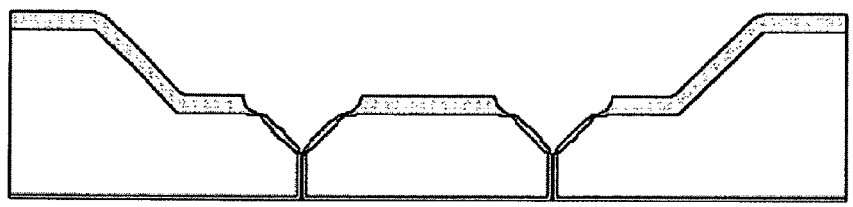
(a)
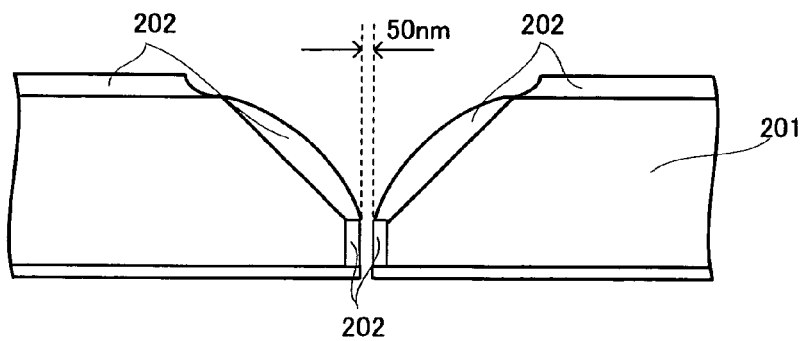
(b)

[FIG. 17]
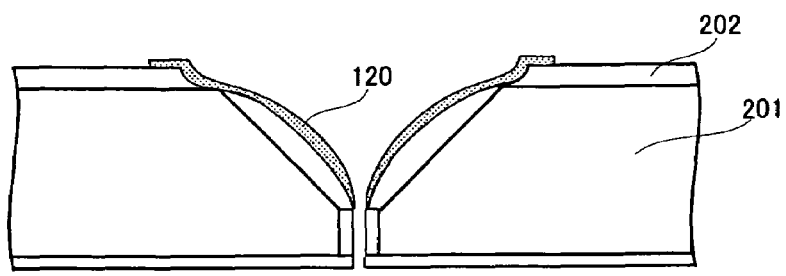
[FIG. 18]
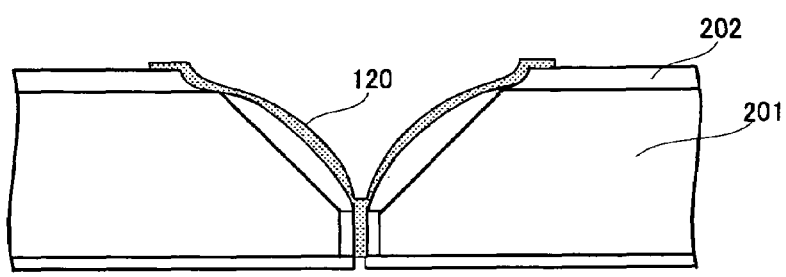
[FIG. 19]
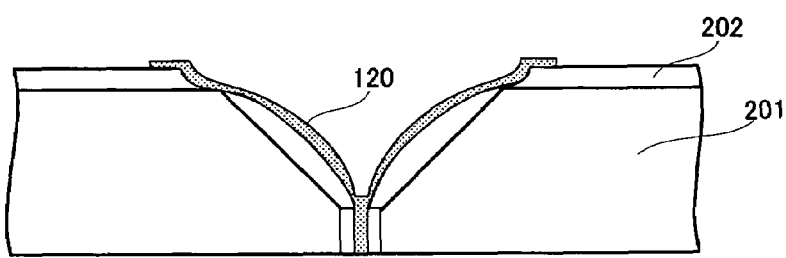

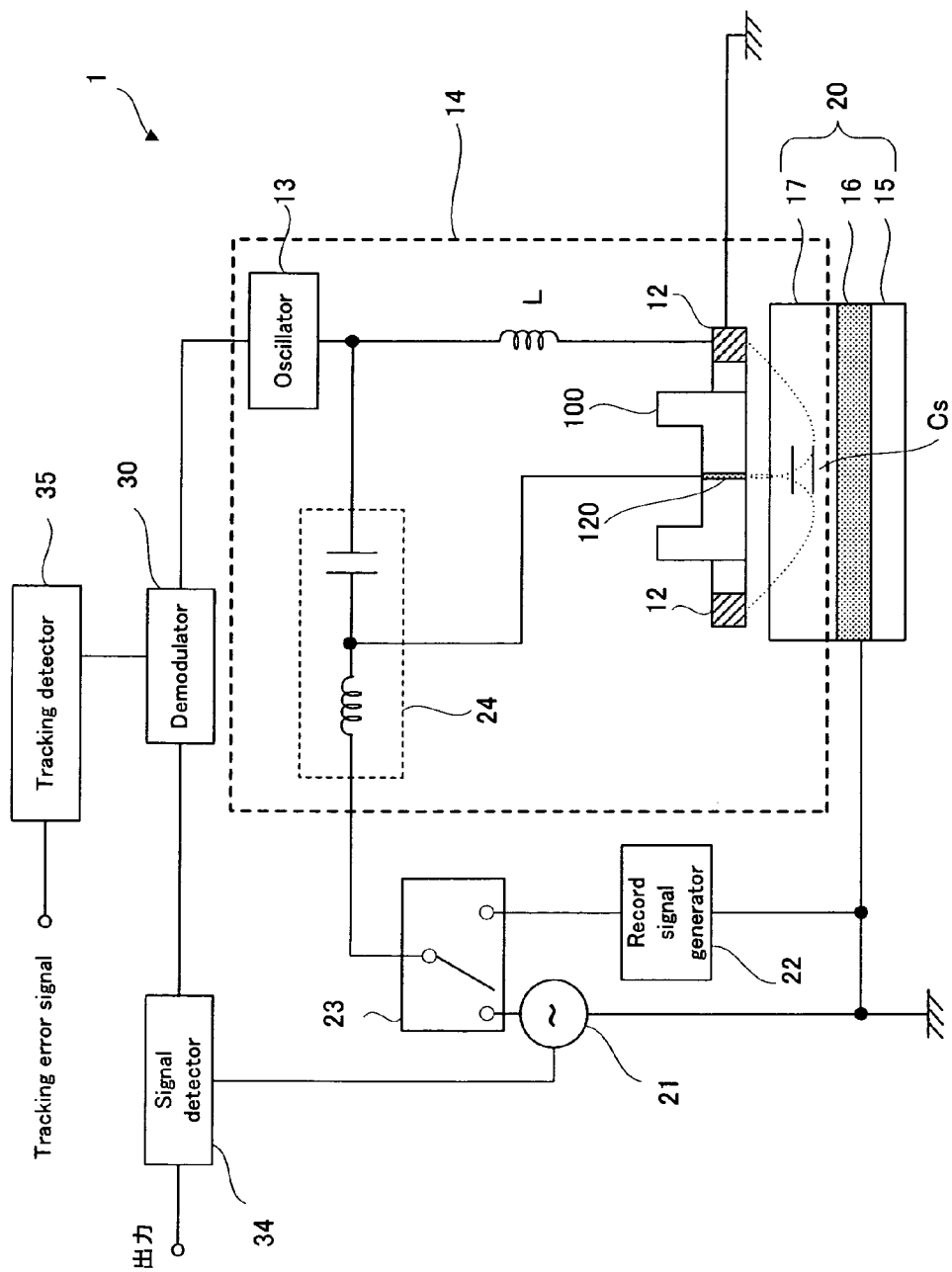
[FIG. 20]

[FIG. 21]
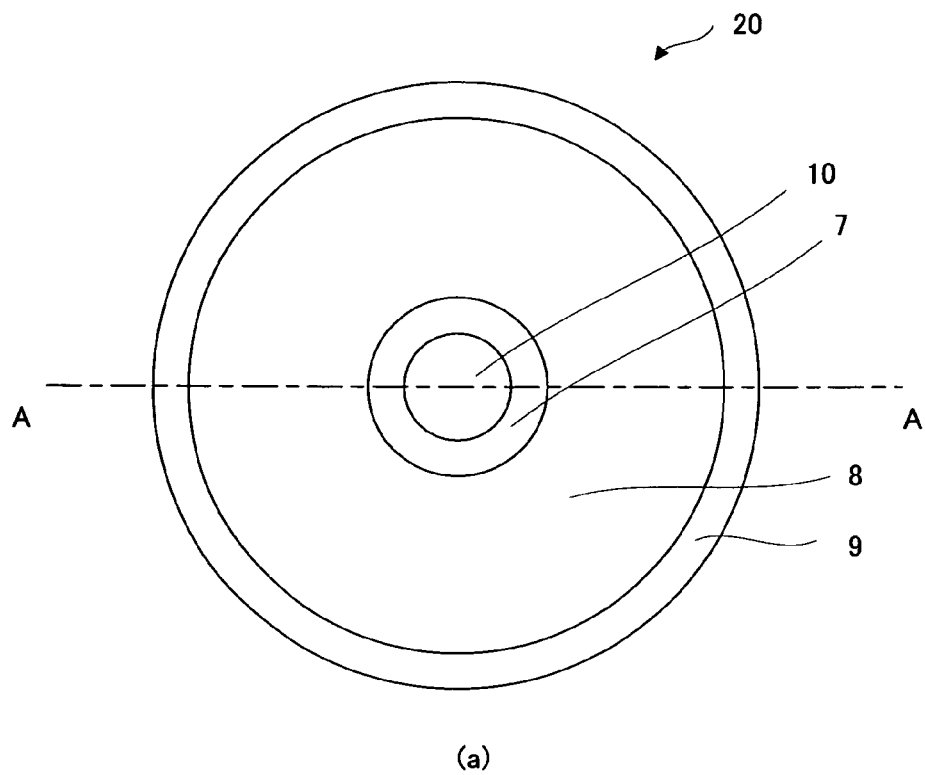
(a)
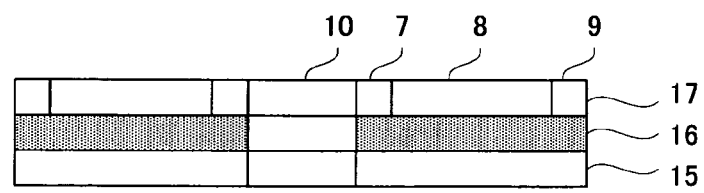
(b)

[FIG. 22]
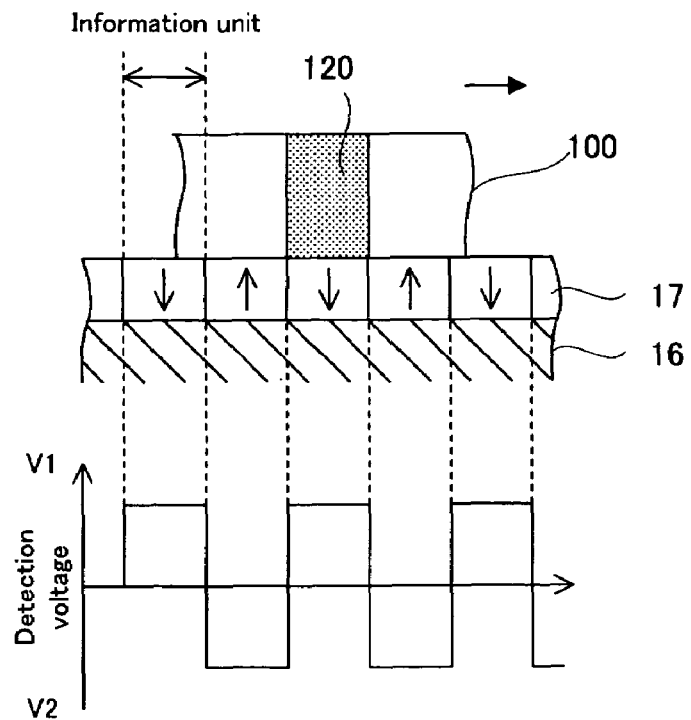
[FIG. 23]
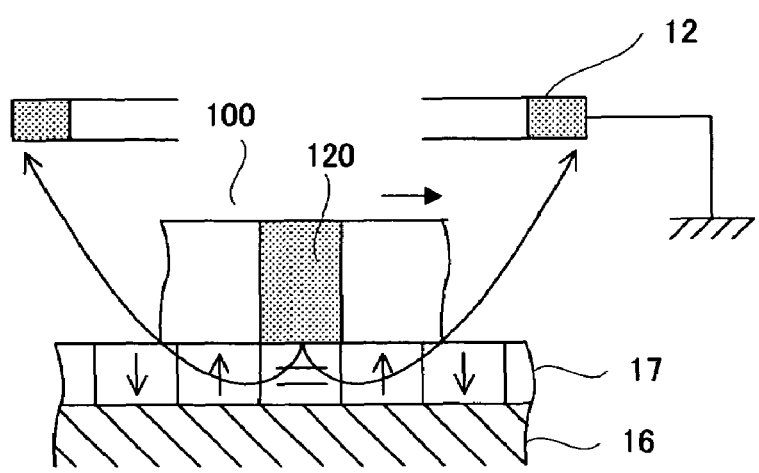

PROBE, RECORDING APPARATUS, REPRODUCING APPARATUS, AND RECORDING/REPRODUCING APPARATUS

This application is the US national phase of international application PCT/JP2005/010884 filed 14 Jun. 2005, which designated the U.S. and claimed priority of JP 2004-178612 filed 16 Jun. 2004, the entire contents of each of which are hereby incorporated by reference.

TECHNICAL FIELD

The present invention relates to a probe for recording and reproducing polarization information recorded in a dielectric substance, such as a ferroelectric recording medium, and a recording apparatus, a reproducing apparatus, and a recording/reproducing apparatus which use the probe, for example.

BACKGROUND ART

The inventors of the present invention has proposed a technology of a recording/reproducing apparatus using SNDM (Scanning Nonlinear Dielectric Microscopy) for nanoscale analysis of a dielectric recording medium. In the SNDM, it is possible to increase the resolution of measurement to sub-nanometer, by using an electrically conductive cantilever (or probe) having a small projection portion on its tip, which is used for atomic force microscopy (AFM) or the like. Recently, a super high-density recording/reproducing apparatus has been developed, wherein the apparatus records data into a recording medium having a recording layer made of a ferroelectric material by using the technology of SNDM (refer to a patent document 1).

On the recording/reproducing apparatus using such SNDM, the information is reproduced by detecting the positive/negative direction of polarization of the recording medium. This is performed by using the fact that the oscillation frequency of a LC oscillator, which includes a high-frequency feedback amplifier including a L component, the electrically conductive probe mounted on the amplifier, and the capacitance Cs of a ferroelectric material under the probe, is changed by a change $\Delta C$ in small capacitance, which is caused by the extent of a non-linear dielectric constant caused by the distribution of the positive/negative polarization. Namely, this is performed by detecting a change in the distribution of the positive/negative polarization, as a change in oscillation frequency $\Delta f$.

Moreover, in order to detect the difference in the positive/negative polarization, by applying an alternating electric field to the oscillation frequency at sufficiently low frequency, the oscillation frequency changes with the alternating electric field. At the same time, a ratio of the change in the oscillation frequency, including a code or sign, is determined from the non-linear dielectric constant of the ferroelectric material under the probe. Moreover, by FM (Frequency Modulation)-demodulating and extracting a component caused by the alternating electric field, from a high-frequency signal of the LC oscillator, which is FM-modulated in accordance with the change $\Delta C$ in the small capacitance associated with the application of the alternating electric field, the record information recorded in the ferroelectric recording medium is reproduced.
Patent document 1: Japanese Patent Application Laying Open NO. 2003-085969

DISCLOSURE OF INVENTION

Subject to be Solved by the Invention

With regard to the probe used for such a recording/reproducing apparatus, contacting the tip of the projection portion with the dielectric recording medium or making the tip closer to the dielectric recording medium in the condition that can be regarded as the contact, to thereby record and reproduce the information. At this time, due to the fact that the projection portion contacts the dielectric recording medium or performs similar actions, the projection portion is ablated, and as a result, there is such a technical problem that the operational lifetime of the probe is reduced.

Moreover, in order to improve an information recording speed and reproduction speed, it is also possible to use a multi-probe provided with a plurality of projection portions. In the multi-probe, it is desired that the plurality of projection portions simultaneously contact the dielectric recording medium or perform similar actions, in order to stabilize a recording operation and a reproduction operation. However, it is difficult to form the multi-probe in the condition that the projections portions, which have an extremely small structure, have the same height. Thus, by pressing the multi-probe into the dielectric recording medium, such a condition is realized that the plurality of projection portions simultaneously contact the dielectric recording medium or perform similar actions. However, since the multi-probe is pressed into the dielectric recording medium, the plurality of projection portions are ablated, more quickly, and as a result, there is such a technical problem that the operational lifetime of the probe is reduced.

In order to solve the above-mentioned problems, it is therefore an object of the present invention to provide a probe whose operational lifetime is relatively long, and a recording apparatus, a reproducing apparatus, and a recording/reproducing apparatus which use the probe.

Means for Solving the Object (Probe)

The above object of the present invention can be achieved by a first probe provided with: a substrate having a surface facing a medium; and a point electrode, formed in the substrate, for performing at least one of detection operation of a state of a domain of the medium and change of the state of the domain of the medium, a tip portion, which is an edge portion on a side facing the medium, out of the point electrode being disposed in one point in a plane which is formed in a vicinity of an area portion, in which the point electrode is formed, by the surface.

According to the first probe of the present invention, it is possible to apply a predetermined electric field (or voltage, electric current, etc.) from the point electrode to the medium, apply the predetermined electric field or the like to the point electrode through the medium, or detect an electrical change in the point electrode, for example. As a result, it is possible to record information into a dielectric recording medium described later (e.g. to change the state of the domain of the dielectric recording medium), or to reproduce the information recorded in the dielectric recording medium (e.g. to detect the state of the domain of the dielectric recording medium), for example. The point electrode is formed in the substrate (i.e. in a hole made in the substrate, as described later, or on the substrate, etc.). Incidentally, in the case where the predetermined electric field is applied from the point electrode, the point electrode and the medium may be in contact, or may be separated to the extent that can be regarded as the contact. Moreover, the "point electrode" of the present invention means an electrode having a small size (e.g. on the order of nanometers to sub micrometers, as described later), and it is not necessarily a "point" in a strict sense.

Particularly, in the first probe of the present invention, the tip portion of the point electrode is disposed in one point (i.e. predetermined point) in at least one portion of the area (plane)

of the surface of the substrate. In this at least one portion of the area (plane) of the surface of the substrate, the point electrode is formed. Incidentally, the "vicinity of the area portion" in the present invention means not only the portion in which the point electrode is formed but also its vicinity or surrounding area or adjacent (nearby) area, for example. Moreover, the "tip portion" of the point electrode is the edge portion of the point electrode on the side facing the medium, and it corresponds to the portion of the point electrode nearest to the medium or the portion of the point electrode actually contacting the medium. Thus, in applying an electric field from the point electrode, the tip portion (particularly, the small tip portion) of the point electrode, formed in the one point, contacts the medium or performs similar actions. Then, the tip portion is formed in the plane, which is at least one portion of the surface of the substrate, so that if the tip portion contacts the medium or performs similar actions, the surface of the substrate (particularly, the plane which is at least one portion of the surface) also comes in contact or performs similar actions.

Therefore, physically, due to the presence of the substrate, the first probe of the present invention can contact the medium (or realize the condition that can be regarded as the contact), with the relatively large plane as contact-boundary-surface. Namely, it is possible to increase a physical contact area between the probe and the medium. Thus, it is possible to inhibit or prevent the progress of the ablation of the probe (i.e. the substrate and the point electrode) without local pressure to the point electrode. Therefore, according to the first probe of the present invention, it is possible to relatively increase the operational lifetime. On the other hand, electrically, due to the presence of the point electrode, the first probe of the present invention can contact the medium or perform similar actions in the small contact tip portion. Namely, it is possible to reduce an electrical contact area between the probe and the medium. Thus, on a recording/reproducing apparatus described later, for example, it is possible to realize the high-density data recording operation and reproduction operation.

Consequently, according to the first probe of the present invention, it is possible to increase the physical contact area between the probe and the medium and to reduce the electrical contact area between the probe and the medium. Therefore, it is possible to perform the preferable operation (e.g. data recording operation and reproduction operation, described later) while relatively increasing the operational lifetime of the probe.

In one aspect of the probe of the present invention, the point electrode is formed in the substrate, continuously up to a predetermined height from the medium.

According to this aspect, even if one portion of the substrate is ablated due to the contact between the substrate and the medium, the point electrode can contact the medium or perform similar actions, in the tip portion having the small contact area. Namely, it is possible to maintain the condition that the electrical contact area is small. Thus, it is possible to realize the probe whose operational lifetime is long.

In another aspect of the probe of the present invention, a height of the surface from the medium is equal to a height of the tip portion from the medium.

According to this aspect, in the portion in which the point electrode is formed, the tip portion of the point electrode and the substrate surface can be disposed in the same plane. Thus, it is possible to further increase the physical contact area, and it is possible to prevent the ablation of the point electrode (particularly, its tip portion), more effectively. Thus, it is possible to increase the operational lifetime of the probe.

Incidentally, it is not limited to this aspect, and even if the tip portion is constructed to slightly project from the surface of the substrate to the side facing the medium, for example, it is possible to increase the physical contact area and to reduce the electrical contact area between the medium and the probe, as described above, and it is possible to receive the above-mentioned various benefits. Alternatively, if the tip portion is constructed to subside from the surface of the substrate, oppositely to the side facing the medium, it is possible to prevent the ablation of the probe, more effectively. Such construction of the probe is also included in the scope of the first probe of the present invention described above.

In another aspect of the probe of the present invention, the substrate includes at least one of an insulator and a high-resistance member.

According to this aspect, it is possible to ensure the insulation properties of the substrate and the point electrode, relatively easily. Moreover, in a multi-probe described later, it is possible to ensure the insulation properties among a plurality of point electrodes, relatively easily.

In another aspect of the probe of the present invention, the surface is a plane along the medium.

According to this aspect, it is possible to contact the probe and the medium or perform similar actions, in a preferable condition, with the substrate and the medium contacting without tilting or leaning. For example, it is possible to effectively inhibit or prevent such a disadvantage that the angulated portion of the substrate contacts the medium. Therefore, it is possible to increase the physical contact area, to thereby increase the operational lifetime of the probe.

In another aspect of the probe of the present invention, the point electrode is formed in a hole provided in the substrate.

According to this aspect, it is possible to form the point electrode in the substrate, relatively easily.

In an aspect of the probe in which the point electrode is formed in the hole, as described above, the point electrode may be formed at least by covering a side surface of the hole with a metal film. Moreover, the point electrode may be formed at least by covering a side surface of the hole with a member having electric conductivity. Furthermore, the point electrode may be formed at least by forming a member including a carbon nano material in the hole.

By virtue of such construction, it is possible to form the point electrode, relatively easily.

Incidentally, if the point electrode is formed inside the hole, the substrate and the point electrode are preferably insulated by forming an insulating layer or the like on the side surface of the hole. Moreover, it is not limited to the case where the point electrode is formed by forming the hole, but the substrate and the point electrode are preferably insulated by forming an insulating layer or the like in the boundary portion of the substrate and the point electrode. Thus, as described above, the substrate itself preferably has the insulation properties or high resistance.

In an aspect of the probe in which the point electrode is formed in the hole, as described above, a preliminary hole with a predetermined first diameter is provided in the substrate, and the hole (i.e. the hole in which the point electrode is actually formed) with a second diameter, which is smaller than the first diameter, is provided at least by oxidizing a side surface of the preliminary hole.

By virtue of such construction, by oxidizing the side surface of the preliminary hole, it is possible to expand the side surface, to thereby reduce the diameter of the preliminary hole, as described later. Namely, it is possible to form the hole with a small diameter, relatively easily, and as a result, it is possible to contact the point electrode and the medium or perform similar actions, in the small tip portion.

In an aspect of the probe in which the preliminary hole is formed, as described above, a depression is formed in at least one portion of a back surface, which is on an opposite side to the surface, out of the substrate, and the preliminary hole is provided after a surface of the depression is oxidized.

By virtue of such construction, it is possible to provide the preliminary hole with the first diameter which is relatively small, though it is larger than the second diameter.

In another aspect of the probe of the present invention, the tip portion of the point electrode is in contact with a surrounding member of the substrate, which forms the area portion, on the surface.

According to this aspect, it is possible to construct the probe that the point electrode is preferably distributed on the surface of the substrate.

In another aspect of the probe of the present invention, the point electrode performs at least one of the detection operation of the state of the domain and the change operation of the state of the domain, on the basis of a change in at least one of a voltage applied to and an electric current supplied to the point electrode.

According to this aspect, a predetermined electric field or the like is applied from the point electrode to the medium, or the predetermined electric field or the like is applied to the point electrode through the medium. Alternatively, a voltage value or an electric current value in the point electrode is changed, and thus, some electrical change (e.g. a change in the voltage value, a change in the electric current value, etc.) is detected. Therefore, in accordance with the electrical change or the like, it is possible to detect the state of the domain of the medium, or to change the state of the domain of the medium.

Incidentally, the "voltage applied" and the "electric current supplied" herein are a concept indicating the electrical change in a broad sense, such as the voltage (or its value) and the electric current (or its value) that can be generated or detected in the point electrode, due to the presence of an area having some potential or charges, in addition to the case where they literally indicate the voltage and the electric current that is applied or supplied from a direct current power supply and an alternating current power supply, or the like.

The above object of the present invention can be also achieved by a second probe provided with: a substrate having a surface facing a medium; and a plurality of point electrodes, formed in the substrate, each of which performs at least one of detection operation of the state of the domain and change of the state of the domain of the medium, a tip portion, which is an edge portion on a side facing the medium, of at least one of the point electrodes being disposed in one point in a plane which is formed in a vicinity of an area portion, in which the at least one of the point electrodes is formed, by the surface.

According to the second probe of the present invention, as in the above-mentioned first probe of the present invention, it is possible to increase the physical contact area and to reduce the electrical contact area between the probe and the medium. Therefore, it is possible to receive the same benefits as those of the above-mentioned first probe of the present invention.

Particularly, according to the second probe of the present invention, by forming the tip portion of each point electrode in the one point in the plane of the area portion in which each point electrode is formed, it is possible to dispose the tip portion of each point electrode on the same plane as the surface of the substrate, relatively easily. Therefore, even in the case of the probe having the plurality of point electrodes (e.g. multi-probe), it is unnecessary to press the probe to the medium in order to dispose the tip portions of the point electrodes on the same plane, so that it is possible to inhibit or prevent the progress of the ablation of the probe, more effectively. Therefore, it is possible to increase the operational lifetime of the probe, more effectively.

Incidentally, in response to the various aspects of the above-mentioned first probe of the present invention, the second probe of the present invention can also adopt various aspects.

(Recording Apparatus)

The above object of the present invention can be also achieved by a recording apparatus for recording data into a dielectric recording medium, the recording apparatus provided with: the above-mentioned first or second probe of the present invention (including its various aspects); and a record signal generating device for generating a record signal corresponding to the data.

According to the recording apparatus of the present invention, it is possible to record the data, on the basis of the record signal generated by the record signal generating device, while taking advantage of the above-mentioned first or second probe of the present invention.

Incidentally, in response to the various aspects of the above-mentioned first or second probe of the present invention, the recording apparatus of the present invention can also adopt various aspects.

(Reproducing Apparatus)

The above object of the present invention can be also achieved by a reproducing apparatus for reproducing data recorded in a dielectric recording medium, the reproducing apparatus provided with: the above-mentioned first or second probe of the present invention (including its various aspects); an electric field applying device for applying an electric field to the dielectric recording medium; an oscillating device in which an oscillation frequency is changed in accordance with a difference in capacitance corresponding to a non-linear dielectric constant of the dielectric recording medium; and a reproducing device for demodulating and reproducing an oscillation signal from the oscillating device.

According to the reproducing apparatus of the present invention, by that the electric field applying device applies an electric field to the dielectric recording medium, the oscillation frequency of the oscillating device is changed, due to a change in capacitance corresponding to a change in the non-linear dielectric constant of the dielectric recording medium. Then, the reproducing device demodulates and reproduces the oscillation signal corresponding to a change in the oscillation frequency caused by the oscillating device, to thereby reproduce the data.

Particularly in the present invention, it is possible to reproduce the data, while taking advantage of the above-mentioned first or second probe of the present invention.

Incidentally, in response to the various aspects of the above-mentioned first or second probe of the present invention, the reproducing apparatus of the present invention can also adopt various aspects.

(Recording/Reproducing Apparatus)

The above object of the present invention can be also achieved by a recording/reproducing apparatus for recording data into a dielectric recording medium and for reproducing the data recorded in the dielectric recording medium, the recording/reproducing apparatus provided with: the above-mentioned first or second probe of the present invention (including its various aspects); a record signal generating device for generating a record signal corresponding to the data; an electric field applying device for applying an electric field to the dielectric recording medium; an oscillating device in which an oscillation frequency is changed in accordance with a difference in capacitance corresponding to a non-linear dielectric constant of the dielectric recording medium; and a reproducing device for demodulating and reproducing an oscillation signal from the oscillating device.

According to the recording/reproducing apparatus of the present invention, it is possible to record or reproduce the data, while taking advantage of the above-mentioned first or second probe of the present invention.

Incidentally, in response to the various aspects of the above-mentioned first or second probe of the present invention, the recording/reproducing apparatus of the present invention can also adopt various aspects.

These effects and other advantages of the present invention will become more apparent from the following embodiments.

As explained above, according to the first probe of the present invention, it is provided with the substrate and the point electrode, and the tip portion of the point electrode is disposed in one point in the plane which is formed in the vicinity of the area portion in which the point electrode is formed by the surface of the substrate. Moreover, according to the second probe of the present invention, it is provided with the substrate and the plurality of point electrodes, and the tip portion of at least one point electrode is disposed in one point in the plane which is formed in the vicinity of the area portion, in which the point electrode is formed, by the surface of the substrate. Therefore, it is possible to increase the physical contact area and to reduce the electrical contact area between the probe and the medium, to thereby increase the operational lifetime of the probe.

Moreover, according to the recording device of the present invention, it is provided with the first or second probe of the present invention and the record signal generating device. Therefore, it is possible to receive the various benefits owned by the first or second probe of the present invention.

Moreover, according to the reproducing device of the present invention, it is provided with the first or second probe of the present invention, the electric field applying device, the oscillating device, and the reproducing device. Therefore, it is possible to receive the various benefits owned by the first or second probe of the present invention.

Moreover, according to the recording/reproducing device of the present invention, it is provided with the first or second probe of the present invention, the record signal generating device, the electric field applying device, the oscillating device, and the reproducing device. Therefore, it is possible to receive the various benefits owned by the first or second probe of the present invention.

BRIEF DESCRIPTION OF DRAWINGS

[FIG. 1] FIG. 1 is a perspective view conceptually showing an embodiment of the probe of the present invention.

[FIG. 2] FIG. 2 are a cross sectional view and a bottom view conceptually showing the embodiment of the probe of the present invention.

[FIG. 3] FIG. 3 is a cross sectional view showing an electrode in more detail, provided for the embodiment of the probe of the present invention.

[FIG. 4] FIG. 4 are cross sectional views conceptually showing other structures of the embodiment of the probe of the present invention.

[FIG. 5] FIG. 5 is a perspective view conceptually showing a modified example of the embodiment of the probe of the present invention.

[FIG. 6] FIG. 6 is a cross sectional view conceptually showing one process of a manufacturing method of manufacturing the embodiment of the probe of the present invention.

[FIG. 7] FIG. 7 is a cross sectional view conceptually showing another process of the manufacturing method of manufacturing the embodiment of the probe of the present invention.

[FIG. 8] FIG. 8 is a cross sectional view conceptually showing another process of the manufacturing method of manufacturing the embodiment of the probe of the present invention.

[FIG. 9] FIG. 9 is a cross sectional view conceptually showing another process of the manufacturing method of manufacturing the embodiment of the probe of the present invention.

[FIG. 10] FIG. 10 is a cross sectional view conceptually showing another process of the manufacturing method of manufacturing the embodiment of the probe of the present invention.

[FIG. 11] FIG. 11 is a cross sectional view conceptually showing another process of the manufacturing method of manufacturing the embodiment of the probe of the present invention.

[FIG. 12] FIG. 12 are cross sectional views conceptually showing other processes of the manufacturing method of manufacturing the embodiment of the probe of the present invention.

[FIG. 13] FIG. 13 are cross sectional views conceptually showing other processes of the manufacturing method of manufacturing the embodiment of the probe of the present invention.

[FIG. 14] FIG. 14 is a cross sectional view conceptually showing another process of the manufacturing method of manufacturing the embodiment of the probe of the present invention.

[FIG. 15] FIG. 15 is a cross sectional view conceptually showing another process of the manufacturing method of manufacturing the embodiment of the probe of the present invention.

[FIG. 16] FIG. 16 are a cross sectional view and a plan view conceptually showing another process of the manufacturing method of manufacturing the embodiment of the probe of the present invention.

[FIG. 17] FIG. 17 is a cross sectional view conceptually showing another process of the manufacturing method of manufacturing the embodiment of the probe of the present invention.

[FIG. 18] FIG. 18 is a cross sectional view conceptually showing another process of the manufacturing method of manufacturing the embodiment of the probe of the present invention.

[FIG. 19] FIG. 19 is a cross sectional view conceptually showing another process of the manufacturing method of manufacturing the embodiment of the probe of the present invention.

[FIG. 20] FIG. 20 is a block diagram conceptually showing the basic structure of an embodiment of a dielectric recording/reproducing apparatus which adopts the embodiment of the probe of the present invention.

[FIG. 21] FIG. 21 are a plan view and a cross sectional view conceptually showing a dielectric recording medium used for the reproduction on the dielectric recording/reproducing apparatus in the embodiment.

[FIG. 22] FIG. 22 is a cross sectional view conceptually showing the recording operation of the dielectric recording/reproducing apparatus in the embodiment.

[FIG. 23] FIG. 23 is a cross sectional view conceptually showing the reproduction operation of the dielectric recording/reproducing apparatus in the embodiment.

DESCRIPTION OF REFERENCE CODES 1 dielectric recording/reproducing apparatus
12 return electrode
13 oscillator
14 resonance circuit
16 electrode
17 dielectric material
20 dielectric recording medium
21 alternating current signal generator
22 record signal generator
100, 101 probe
110 substrate
120 electrode 201 silicon substrate
202 silicon dioxide film

BEST MODE FOR CARRYING OUT THE INVENTION

Hereinafter, an embodiment of the probe of the present invention will be explained with reference to the drawings.

(1) Embodiment of Probe

Firstly, with reference to FIG. 1 to FIG. 19, the embodiment of the probe of the present invention will be explained.

(i) Structure of Probe

Firstly, with reference to FIG. 1 to FIG. 4, the structure (i.e. basic structure) of the probe in the embodiment will be explained. FIG. 1 is a perspective view conceptually showing the structure of the probe in the embodiment. FIG. 2 are a cross sectional view and a bottom view conceptually showing the structure of the probe in the embodiment. FIG. 3 is a cross sectional view showing an electrode in more detail, provided for the probe in the embodiment. FIG. 4 are cross sectional views conceptually showing other structures of the probe in the embodiment.

As shown in FIG. 1, a probe 100 in the embodiment is provided with: a substrate 110; and a plurality of electrodes 120 (one specific example of the "point electrode" of the present invention).

The substrate 110 includes an insulating member or a high-resistance member, such as silicon and glass, for example, and its inner shape is constructed as a pyramid shape with the top portion being plane. Then, on the inner surface side, there are formed a plurality of depressions (four depressions, in FIG. 1) in a quadrangular pyramid shape, and there is formed a through-hole near the top portion (i.e. tip) of each depression toward a surface of the substrate 110 on a side facing a dielectric recording medium 20 (the surface on the lower side in FIG. 1). The electrode 120 is formed in the quadrangular pyramid depression and the through-hole.

Incidentally, the material of the substrate 110 is not limited to silicon and glass or the like, and any member having insulation properties and high resistance can be used as the substrate 110.

The electrode 120 is constructed to apply an electric field between the electrode 120 and the dielectric recording medium 20, at the time of recording operation and reproduction operations of a dielectric recording/reproducing apparatus described later. The electrode 120 includes various metal, such as chromium and platinum, or its alloy, and it is formed in the through-hole formed in the substrate 110. Specifically, the electrode 120 is formed, as shown in FIG. 1, by plating or depositing metal on the surfaces of the quadrangular pyramid depression and the through-hole. Moreover, the electrode 120 may be formed so as to fill (i.e. block) the through-hole with the various metal and/or its alloy or the like. Moreover, the electrode 120 has a small circular shape on the surface on the side of the substrate 110 facing the dielectric recording medium 20. The radius of the electrode is preferably about 400 nm or less, more preferably about 100 nm or less, and further preferably about 50 nm (or less), for example.

Preferably, in the probe 100 in the embodiment, as shown in FIG. 2(a), the tip of the electrode 120 (i.e. which is a portion of the electrode 120 contacting the dielectric recording medium 20 and which is one specific example of the "tip portion" of the present invention) and the surface of the substrate 110 on the side facing the dielectric recording medium 20 are disposed in the same plane. Namely, the electrode 120 is formed such that the tip of the electrode 120 does not project from the surface of the substrate 110 nor subside into the substrate 110 on the side facing the dielectric recording medium 20, and that the tip is aligned with the surface of the substrate 110 on the side facing the dielectric recording medium 20.

Thus, as shown in the bottom view of FIG. 2(b) (i.e. the view obtained by observing the probe 100 in the embodiment from the side facing the dielectric recording medium 20), it is possible to realize such a probe 100 that the electrodes 120 having a relatively small area are regularly (or separately) distributed in the plane of the substrate 110 having a relatively large area. Namely, it is possible to realize the probe 100 having the plurality of small point electrodes.

Thus, physically, due to the presence of the substrate 110, the probe 100 in the embodiment can contact the dielectric recording medium 20 (or can realize the condition that can be regarded as the contact), as its boundary surface having the relatively large plane. Namely, it is possible to increase the physical contact area between the probe 100 and the dielectric recording medium 20. For example, as in the probe 100 in the embodiment, in the case of the probe provided with the plurality of electrodes 120 (multi-probe), it is possible to increase the contact area up to about 5 mm square, for example. Alternatively, in the case of a probe provided with a signal electrode (single probe), it is possible to increase the contact area up to about 500 μm square, for example. Thus, it is possible to inhibit or prevent the progress of the ablation of the probe 100 (i.e. the substrate 110 and the electrodes 120), since local force (local pressure) is not applied to the electrodes 120 (or the substrate 110). Therefore, according to the probe 100 in the embodiment, it is possible to relatively increase the operational lifetime.

On the other hand, electrically, due to the presence of the electrodes 120, the probe 100 can contact the dielectric recording medium 20 or perform similar actions in small contact points. Namely, it is possible to reduce the electrical contact area between the probe 100 and the dielectric recording medium 20. For example, considering each one electrode, it is possible to reduce the contact area until corresponding to the size of a circle with a diameter of 400 nm, preferably 100 nm, and more preferably about 50 nm. Thus, on the dielectric recording/reproducing apparatus described later, for example, it is possible to further reduce such an area that the polarization direction of a dielectric material, which is an information recording unit, can be changed, as occasion demands. More specifically, it is possible to record information at high density by a unit smaller than the wavelength (about 400 nm) of laser light, which is to determine the recording density of the information of a next-generation DVD (e.g. Blu-ray Disc and HD DVD, etc.) using blue laser light, which is currently developed, for example. Thus, it is possible to realize the high-density data recording operation and reproduction operation.

Moreover, since the probe 100 can contact the dielectric recording medium 20 or perform similar actions on the relatively large plane, it is possible to eliminate unnecessary or useless floating of the probe 100 from the dielectric recording medium 20. Thus, it is possible to stably contact the probe 100 with the dielectric recording medium 20 or perform similar actions. Namely, it is possible to inhibit or prevent such a disadvantage that the electrode 120 is separated too much from the dielectric recording medium 20 because of the unnecessary or useless floating of the probe 100 and a disadvantage that the recording operation and the reproduction operation cannot be properly performed.

Moreover, since the tip of the electrode 120 is disposed in the same plane as the surface of the substrate 110 on the side facing the dielectric recording medium 20, it is possible to inhibit or prevent such a disadvantage that some dirt, such as small dusts, is attached to the tip of the electrode, which is seen in a probe with an electrode or electrodes having a projective shape, for example. By this, it is possible to effectively inhibit or prevent a disadvantage of the deterioration of signal features in the recoding operation and the reproduction operation.

In addition, the electrode 120 is formed continuously in the through-hole formed in the substrate 110. Thus, even if one portion of the substrate 110 is ablated, due to the contact of the substrate 110 and the dielectric recording medium 20, there is left the through-hole with a small diameter in which the electrode 120 is formed, so that it is possible to continuously contact the electrode 120 having a small circular shape, with the dielectric recording medium 20. Namely, it is possible to maintain the state that the electrical contact area between the probe 100 and the dielectric recording medium 20 is relatively small.

Moreover, as shown in FIG. 3, a silicon dioxide film is formed between the substrate 110 and the electrode 120, to thereby ensure insulation properties between the substrate 110 an the electrode 120 (or between one electrode 120 and another electrode 120). Therefore, even if the plurality of electrodes 120 are provided, it is possible to preferably perform the recording operation and the reproduction operation in each electrode 120. The aspect that the silicon dioxide film is formed will be described in more detail, in the explanation of a manufacturing method of manufacturing the probe in the embodiment, described later.

Incidentally, it is obvious that the insulation properties are ensured to some extent by the substrate 110 having insulation properties or high resistance. Therefore, if the insulation properties are ensured by the substrate 110, the silicon dioxide film is not necessarily provided.

Moreover, by setting the inner shape of the substrate 110 to the pyramid shape, it is possible to maintain the strength of the probe 100 as a whole, while ensuring a desired thickness in the portion that the electrode 120 is formed. However, from the viewpoint of increasing the operational lifetime of the probe 100 described above, it is obvious that the inner shape of the substrate 100 is not necessarily the pyramid shape. Moreover, from the viewpoint of increasing the operational lifetime of the probe 100, there is not necessarily provided the depression in the quadrangular pyramid shape, formed in the inner surface of the substrate 110.

Moreover, from the viewpoint of increasing the physical contact area and reducing the electrical contact area between the probe 100 and the dielectric recording medium 20, the electrode 120 is not necessarily formed continuously in the through-hole, and it is only necessary to form the electrode 120 so as to contact at least the dielectric recording medium 20 or perform similar actions. For example, even if there is no through-hole extending from the top portion of the depression in the quadrangular pyramid shape, it is only necessary to construct the probe so as to realize substantially the circular electrode 120 with a diameter about 50 nm to 400 nm in the top portion. Moreover, there is not necessarily the through-hole, and the electrode 120 may be formed in a hole whose upper part is covered with the substrate 110 or the like, for example.

Moreover, the electrode 120 is not necessarily the above-mentioned metal, but it may be a member having electrical conductivity, such as silicon and diamond in which impurities, such as boron, are doped, for example. Alternatively, by causing the growth of carbon nanotube (CNT), carbon nanohorn, and amorphous carbon or the like in the through-hole formed in the substrate 110, it may be used as the electrode 120. In short, if the member is capable of applying an electric field to the dielectric recording medium 20, it can be used as the electrode 120 provided for the probe in the embodiment.

Moreover, it is only necessary to form the electrode 120 on the side surfaces of the through-hole and the quadrangular pyramid depression formed in the substrate 110. However, it is obvious that the electrode 120 may be formed by filling the entire through-hole with metal or the like.

Incidentally, as shown in FIG. 4(a), the tip of the electrode 120 may be constructed to slightly project (i.e. in a convex condition) from the surface of the substrate 110 on the side facing the dielectric recording medium 20. Even in such construction, as compare to the size of the surface of the substrate 110 on the side facing the dielectric recording medium 20, the tip of the electrode 120 is extremely small. Thus, it is possible to increase the physical contact area and reduce the electrical contact area between the probe 100 and the dielectric recording medium 20. However, from the viewpoint of effectively inhibiting or preventing the progress of the ablation of the probe 100, the tip of the electrode 120 is preferably in the same plane as the surface of the substrate 110 on the side facing the dielectric recording medium 20.

Alternatively, from the viewpoint of more effectively inhibiting or preventing the progress of the ablation of the probe 100, the tip of the electrode 120 may be also constructed to slightly subside (i.e. in a concave condition) from the surface of the substrate 110 on the side facing the dielectric recording medium 20. Even in such construction, an electric field can be applied from the electrode 120 to the dielectric recording medium 20, so that it is possible to inhibit or prevent the progress of the ablation of the probe 100, more effectively, without influence on the recording operation and the reproduction operation.

(ii) Modified Example of Probe

Next, with reference to FIG. 5, a modified example of the probe in the embodiment will be explained. FIG. 5 is a perspective view conceptually showing the modified example of the structure of the probe in the embodiment when it is observed from the bottom surface side (the side facing the dielectric recording medium 20).

As shown in FIG. 5, in a probe 101 in the modified example, desired grooves (or concavity and convexity) are formed on the surface of the substrate 110 on the side facing the dielectric recording medium 20. For example, such a groove that makes a wind way when the probe 101 is displaced on the recording surface of the dielectric recording medium 20 may be formed. Even in the probe 101 in the modified example, the tip of the electrode 120 and the substrate 110 are disposed in the same plane, in the portion (moreover, in its surrounding portion) that the electrode 120 is formed, out of the surface of the substrate 110 on the side facing the dielectric recording medium 20. The portion on which the electrode 120 is formed and the surrounding portion correspond to one specific example of the "vicinity of the area portion" of the present invention. In other words, the tip of the electrode 120 is formed in a predetermined point in the surface of the area portion in which the electrode 120 is formed, out of the surface of the substrate 110 on the side facing the dielectric recording medium 20.

Even in such construction, if the tip of the electrode 120 and the substrate 110 are disposed in the same plane, at least in the portion in which the electrode 120 is formed, out of the surface of the substrate 110 on the side facing the dielectric recording medium 20, then, it is possible to receive the same benefits as those of the probe 100 in the embodiment described above. However, from the viewpoint of further increasing the physical contact area between the probe 100 and the dielectric recording medium 20, a wider range of the substrate 110 and the tip of the electrode 120 are preferably disposed in the same plane.

(iii) Manufacturing Method of Probe

Next, with reference to FIG. 6 to FIG. 19, a manufacturing method of manufacturing the probe in the embodiment will be explained. FIG. 6 to FIG. 19 are cross sectional views conceptually showing each process of the manufacturing method of manufacturing the probe in the embodiment.

Firstly, as shown in FIG. 6, a silicon substrate 201 is provided. The silicon substrate 201 mainly becomes the substrate 110 provided for the probe 100, through processes described later. Incidentally, it is preferable to provide such a silicon substrate 201 that a silicon dioxide film is formed along (or in parallel with) the (100 surface) of a crystal lattice structure in the subsequent processes. This is to form the depression in the quadrangular pyramid shape (or pyramid shape) in the portion in which the electrode 120 is formed, by performing anisotropic etching, as described later (refer to FIG. 11). The silicon substrate 201 is referred to as a (100) substrate.

Then, a silicon dioxide (SiO2) film 202 is formed on the surfaces on the front and back sides of the silicon substrate 201. Here, by locating the silicon substrate 201 in a high-temperature oxidation atmosphere, the silicon dioxide (SiO2) film 202 may be formed on the surfaces.

Then, photoresist 203 is coated on the silicon dioxide film 202 by spin coating method, for example, and then patterning is performed. Specifically, after the photoresist 203 is coated on the silicon dioxide film 202 that is formed on one side (e.g. the surface on the front) of the silicon substrate 201, ultraviolet rays or the like are irradiated by using a photo mask which is patterned in accordance with the inner shape of the substrate 110. After that, by developing it, the patterning of the photoresist 203 is performed. Of course, the patterning may be performed by using EB (Electron Beam) resist and other materials, for example.

Then, etching is performed on the silicon substrate 201 on which the patterning of the photoresist 203 is performed. Here, the etching is performed in a portion of the silicon dioxide film 202 on which the photoresist 203 is not coated, by using BHF (Buffered HydroFluoric acid) or the like, for example. However, the etching may be performed by using another etchant, or the etching may be performed by dry etching.

After the etching of the silicon dioxide film 202, the photoresist 203 is removed. By this, the silicon substrate 201 and the silicon dioxide film 202 shown in FIG. 7 are left. Here, the photoresist 203 may be removed by dry etching or wet etching.

Then, anisotropic etching is performed on the silicon substrate 201. Here, the anisotropic etching is performed by using alkaline etchant, such as TMAH (tetramethylammonium hydroxide) KOH (potassium hydroxide), for example.

At this time, the silicon substrate 201 has such a character that the etching progresses in the normal direction of the (100) surface (i.e. a direction perpendicular to the silicon substrate 201 in FIG. 11), whereas it is hard that the etching progresses in the normal direction of a (111) surface (i.e. a direction of about 45 degrees with respect to the silicon substrate 201 in FIG. 11). The anisotropic etching is performed by using this character, to thereby form the substrate 110 in the pyramid shape with the top portion being plane, as shown in FIG. 8.

The depression on the inner surface side is preferably formed by etching the silicon substrate 201 only by a thickness of about 250 μm. Then, the silicon substrate 201 in the depression portion is preferably about 100 μm or less in thickness.

Then, as shown in FIG. 9, the silicon dioxide film 202 is formed again on the surfaces on the front and back sides of the silicon substrate 201.

Then, as shown in FIG. 10, in order to form the depression having the quadrangular pyramid shape, one portion of the silicon dioxide film 202 is etched. Here, by using the photoresist or the like, as described above, patterning is performed so as to etch the silicon dioxide film 202 in a rectangular shape of 50 μm square, for example. In accordance with the patterning, the silicon dioxide film 202 is etched.

Then, as shown in FIG. 11, anisotropic etching is performed on the silicon substrate 201. Here, the anisotropic etching is performed by using alkaline etchant, such as TMAH (tetramethylammonium hydroxide) KOH (potassium hydroxide), for example. By this, the silicon substrate 201 is etched to have the depression in the quadrangular pyramid shape.

Specifically, the thickness from the top portion of the quadrangular pyramid depression (i.e. the lowest portion in FIG. 11) to the surface of the silicon substrate 201 on the side facing the dielectric recording medium 20 is preferably about 1u m or less. At this time, in view of a rate of progression of the etching or the like, it is preferable to adjust the thickness of the silicon substrate 201 which is left by the etching in FIG. 8, or the size and shape or the like of the silicon dioxide film 202 which is etched in FIG. 10.

Then, as shown in FIG. 12(a), by locating the silicon substrate 201 again in a high-temperature oxidation atmosphere, the silicon dioxide film 202 is formed. In the formation of the silicon dioxide film 202, as shown in detail in FIG. 12(b), it is difficult to form the silicon dioxide film 202 in the edge portion on the surface of the quadrangular pyramid depression (e.g. the top portion of the quadrangular pyramid depression, or the like), whereas it is easier to form the silicon dioxide film 202 with approaching the central portion of the surface of the quadrangular pyramid depression. Namely, the silicon dioxide film 202 is formed to be relatively thin in the edge portion on the surface of the quadrangular pyramid depression, and the silicon dioxide film 202 is formed to be relatively thick with approaching the central portion of the surface of the quadrangular pyramid depression.

After that, as shown in FIG. 13(a), the formed silicon dioxide film 202 is slightly etched. At this time, the silicon dioxide film 202 formed in the edge portion of the quadrangular pyramid depression in the process in FIG. 12 (i.e. the silicon dioxide film 202 formed to be relatively thin) is removed. Then, as shown in FIG. 13(b), a gap of the silicon dioxide film 202 is formed in the area of about 100 nm of the tip portion of the quadrangular pyramid depression. The gap of the silicon dioxide film 202 is preferably about 100 nm.

Then, as shown in FIG. 14, the silicon dioxide film 202 formed on the surface of the silicon substrate 201 on the side facing the dielectric recording medium is removed.

Then, as shown in FIG. 15, the through-hole with a diameter of about 100 nm is formed in the silicon substrate 201. The through-hole is formed by scraping away or removing the silicon substrate 201 by irradiating an ion beam to the gap of about 100 nm of the silicon dioxide film 202, shown in FIG. 13(B), by ICP-RCE (Inductively Coupled Plasma Reactive Ion Etching), for example.

Then, as shown in FIG. 16(a), the silicon substrate 201 with the through-hole formed (particularly, the side surface of the through-hole) is oxidized, to thereby form the silicon dioxide film 202. At this time, the silicon is oxidized to become the silicon dioxide, so that its volume increases. Thus, as shown in more detail in FIG. 16(b), the diameter of the through-hole is narrowed. Therefore, the formation of the silicon dioxide film 202 causes the formation of the hole with a diameter of about 50 nm, for example.

Incidentally, in the explanation below, in order to simplify the drawings, only one electrode 120 is extracted from the plurality of electrodes 120 in the drawings and explained. Of course, it is obvious that the same processes are performed in the other electrodes 120 out of the plurality of electrodes 120.

Then, as shown in FIG. 17, at least one portion of the electrode 120 is formed. Specifically, at least by depositing metal or the like on the surface of the quadrangular pyramid depression, at least one portion of the electrode 120 is formed. Here, the electrode 120 is formed by using vapor deposition method, spattering method, Cupper-CVD method, or the like, for example. At this time, in order to increase the adhesion of the electrode 120 to the silicon dioxide film 202, the electrode 120 may be formed by depositing a base, such as titanium, before depositing metal or the like, which is the material of the electrode 120, and then, depositing the metal or the like.

After that, on the basis of the at least one portion of the electrode 120, formed in the process in FIG. 17, the side face or inside of the through-hole is plated with metal. Namely, by causing the growth of metal within the through-hole by using the electrode 120 formed in the process in FIG. 17 as a seed, the electrode 120 is formed in which the inside of the through-hole is filled with the metal, as shown in FIG. 18.

Then, the surface of the silicon substrate 201 or the like on the side facing the dielectric recording medium 20 is grinded or polished or the like to make it smooth. Here, the grinding or polishing or the like is performed to make the surface almost plane, and more preferably, an almost parallel plane with respect to the recording surface of the dielectric recording medium 20. By this, it is possible to manufacture the probe in the embodiment described above.

(2) Embodiment of Recording/Reproducing Apparatus

Next, with reference to FIG. 20 to FIG. 23, a recording/reproducing apparatus which uses the above-mentioned probe in the embodiment will be explained.

(i) Basic Structure

Firstly, the basic structure of the dielectric recording/reproducing apparatus in the embodiment will be explained, with reference to FIG. 20. FIG. 20 is a block diagram conceptually showing the basic structure of the dielectric recording/reproducing apparatus in the embodiment.

A dielectric reproducing/reproducing apparatus 1 is provided with: the probe 100 for applying an electric field, with the electrode 120 facing to a dielectric material 17 of the dielectric recording medium 20; a return electrode 12 for returning a high-frequency electric field for signal reproduction, applied from the probe 100 (particularly, the electrode 120); an inductor L disposed between the probe 100 (particularly, the electrode 120) and the return electrode 12; an oscillator 13 which oscillates at a resonance frequency determined from the inductor L and a capacitance Cs of a portion which is polarized in accordance with record information and which is formed in the dielectric material 17 under the probe 100 (particularly, the electrode 120); an alternating current (AC) signal generator 21 for applying an alternating electric field to detect the state of the polarization recorded in the dielectric material 17; a record signal generator 22 for recording the polarization state into the dielectric material; a switch 23 for changing the outputs of the AC signal generator 21 and the record signal generator 22; HPF (High Pass Filter) 24; a demodulator 30 for demodulating a FM signal modulated by the capacitance corresponding to the polarization state owned by the dielectric material 17 under the probe 100; a signal detector 34 for detecting data from the demodulated signal; a tracking error detector 35 for detecting a tracking error signal from the demodulated signal; and the like.

With regard to the probe 100, the above-mentioned probe 100 in the embodiment or the like is used. Out of the probe 100, the electrode 120 is connected to the oscillator 13 through the HPF 24, and is connected to the AC signal generator 21 and the record signal generator 22 through the HPF 24 and the switch 23. Then, the probe 100 functions as the electrode for applying an electrical field to the dielectric material 17.

Incidentally, the probe 100 is illustrated to have the single electrode 120 in order to simplify the explanation. However, of course, the probe 100 may be provided with a plurality of electrodes 120. In this case, a plurality of AC signal generators 21 are preferably provided in association with the respective electrodes 120. Moreover, in order to discriminate reproduction signals corresponding to the AC signal generators 21, it is preferable that a plurality of signal detectors 34 are provided, and that the signal detectors 34 obtain reference signals from the respective AC signal generators 21, to thereby output the corresponding reproduction signals.

The return electrode 12 is an electrode for returning the high-frequency electric field (i.e. a resonance electric field from the oscillator 13) applied to the dielectric material 17 from the probe 100 (particularly, the electrode 120), and is located to surround the probe 100. Incidentally, the shape and placement of the return electrode 12 can be arbitrarily set, if the high-frequency electric field returns to the return electrode 12 without resistance. Moreover, the return electrode 12 may be formed on the silicon substrate 110 provided for the probe 100.

The inductor L is located between the probe 100 and the return electrode 12, and may be formed from a microstripline, for example. A resonance circuit 14 is constructed including the inductor L and the capacitance Cs. The inductance of the inductor L is determined such that this resonance frequency is approximately 1 GHz, for example.

The oscillator 13 is an oscillator which oscillates at the resonance frequency determined from the inductor L and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM modulation, it is possible to read the recorded data recorded in the dielectric recording medium 20.

Incidentally, as described in detail later, the probe 100, the return electrode 12, the oscillator 13, the inductor L, the HPF 24, and the capacitance Cs of the dielectric material 17 constitute the resonance circuit 14, and the FM signal amplified in the oscillator 13 is outputted to the demodulator 30.

The AC signal generator 21 applies an alternating electric field between the return electrode 12 and an electrode 16. Moreover, in the dielectric recording/reproducing apparatus which uses the probe provided with the plurality of electrodes 120, the frequencies of the alternating electric fields are used as reference signals for synchronization, to thereby discriminate signals detected by the probes 100. The frequency of the alternating electric field is centered on about 5 kHz. In that condition, the alternating electric field is applied to the domains of the dielectric material 17.

The record signal generator 22 generates a signal for recording and supplies it to the probe 100 at the time of recording. This signal is not limited to a digital signal and it may be an analog signal. The signal includes various signals, such as audio information, video information, and digital data for a computer. Moreover, the AC signal superimposed on the record signal is to discriminate and reproduce the information on each probe, as the reference signal at the time of signal reproduction.

The switch 23 selects the output so as to supply the signal from the AC signal generator 21 at the time of reproduction, and the signal from the record signal generator 23 at the time of recording, to the probe 100. For this apparatus, a mechanical relay and a semiconductor circuit are used. The switch 23 is preferably constructed from the relay in the case of the analog signal, and the semiconductor circuit in the case of the digital signal.

The HPF 24 includes an inductor and a condenser, and is used to construct a high pass filter for cutting off a signal system so that the signals from the AC signal generator 21 and the record signal generator 23 do not interfere with the oscillation of the oscillator 13. The cutoff frequency is $f=1/2\pi\sqrt{\{LC\}}$. Here, L is the inductance of the inductor included in the HPF 24, and C is the capacitance of the condenser included in the HPF 24. The frequency of the AC signal is about 5 KHz, and the oscillation frequency of the oscillator 13 is about 1 GHz. Thus, the separation is sufficiently performed with the first order LC filter. A higher-order filter may be used, but the number of elements increases, so that there is a possibility that the apparatus becomes bigger.

The demodulator 30 demodulates the oscillation frequency of the oscillator 13, which is FM-modulated due to the small change of the capacitance Cs, and reconstructs a waveform corresponding to the polarized state of a portion which is traced by the prove 100. If the recorded data are digital data of "0" and "1", there are two types of frequencies to be demodulated. By judging the frequency, the data reproduction is easily performed.

The signal detector 34 reproduces the recorded data from the signal demodulated on the demodulator 30. A lock-in amplifier is used as the signal detector 34, for example, and coherent detection or synchronized detection is performed on the basis of the frequency of the alternating electric field of the AC signal generator 21, to thereby reproduce the data. Incidentally, it is obvious that another phase detection device may be used.

The tracking error detector 35 detects a tracking error signal for controlling the apparatus, from the signal demodulated on the demodulator 30. The detected tracking error signal is inputted into a tracking mechanism for the control.

Next, one example of the dielectric recording medium 20 shown in FIG. 20 will be explained with reference to FIG. 21. FIG. 21 are a plan view and a cross sectional view conceptually showing one example of the dielectric recording medium 20 used in the embodiment.

As shown in FIG. 21(a), the dielectric recording medium 20 is a disc-shaped dielectric recording medium, and is provided with: a center hole 10; and an inner area 7, a recording area 8, and an outer area 9, which are located concentrically from the center hole 10 in this order. The center hole 10 is used in mounting the dielectric recording medium 20 on a spindle motor or the like.

The recording area 8 is an area to record the data therein and has tracks and spaces between the tracks. Moreover, for the tracks and the spaces, there is provided an area to record therein control information associated with the record and reproduction. Furthermore, the inner area 7 and the outer area 9 are used to recognize the inner position and the outer position of the dielectric recording medium 20, respectively, and can be used as areas to record therein information about the data to be recorded, such as a title, its address, a recording time length, and a recording capacity. Incidentally, the above-described structure is one example of the dielectric recording medium 20, and another structure, such as a card-shape, can be also adopted.

Moreover, as shown in FIG. 21(b), the dielectric recording medium 20 is formed such that the electrode 16 is laminated on a substrate 15 and that the dielectric material 17 is laminated on the electrode 16.

The substrate 15 is Si (silicon), for example, which is a preferable material in its strength, chemical stability, workability, or the like. The electrode 16 is intended to generate an electric field between the electrode 16 and the probe 100 (or the return electrode 12). By applying such an electric field to the dielectric material 17 that is equal to or stronger than the coercive electric field of the dielectric material 17, the polarization direction is determined. By determining the polarization direction in accordance with the data, the recording is performed.

The dielectric material 17 is formed by a known technology, such as spattering $LiTaO_3$ or the like, which is a ferroelectric substance, onto the electrode 16. Then, the recording is performed with respect to the Z surface of $LiTaO_3$ in which the plus and minus surfaces of the polarization have a 180-degree domain relationship. It is obvious that another dielectric material may be used. In the dielectric material 17, the small polarization is formed at high speed, by a voltage for data, which is applied simultaneously with a direct current bias voltage.

Moreover, as the shape of the dielectric recoding medium 20, for example, there are a disc shape and a card shape and the like. The displacement of the relative position with respect to the probe 100 is performed by the rotation of the medium, or by displacing either the probe 100 or the medium linearly (e.g. on two axes of an X axis a Y axis).

(ii) Operation Principle

Next, with reference to FIG. 22 and FIG. 23, the operation principle of the dielectric recording/reproducing apparatus 1 in the embodiment will be explained. Incidentally, in the explanation below, one portion of the constituent elements of the dielectric recording/reproducing apparatus 1 shown in FIG. 20 is extracted and explained.

(Recording Operation)

Firstly, with reference to FIG. 22, the recording operation of the dielectric recording/reproducing apparatus in the embodiment will be explained. FIG. 22 is a cross sectional view conceptually showing the information recording operation.

As shown in FIG. 22, by applying an electric field which exceeds the coercive electric field of the dielectric material 17 between the probe 100 (i.e. the electrode 120 provided for the probe 100) and the electrode 16, the dielectric material 17 is polarized having a direction corresponding to the direction of the applied electric field. Then, by controlling an applying voltage to thereby change the polarization direction, it is possible to record the predetermined information. This uses such a characteristic that if an electric field which exceeds the coercive electric field of a dielectric substance is applied to the dielectric substance (particularly, a ferroelectric substance), the polarization direction is reversed, and that the polarization direction is maintained.

For example, it is assumed that when an electric field which directs from the probe 100 to the electrode 16 is applied, the micro domain has downward polarization P, and that when an electric field which directs from the electrode 16 to the probe 100 is applied, the micro domain has upward polarization P. This corresponds to the state that the data information is recorded. If the probe 100 is operated in an arrow-pointing direction, a detection voltage corresponds to the polarization P and is outputted as a square wave which swings up and down. Incidentally, this level changes depending on the polarization extent of the polarization P, and can be recorded as an analog signal.

Particularly in the embodiment, the above-mentioned probe 100 or the like in the embodiment is used as the probe, so that it is possible to increase the physical contact area and reduce the electrical contact area between the probe 100 and the dielectric recording medium 20. Therefore, the ablation of the probe 100 does not proceed, as described above, which increases the operational lifetime of the probe 100. By using such a probe 100, it is possible to preferably perform the recording operation.

(Reproduction Operation)

Next, with reference to FIG. 23, the reproduction operation of the dielectric recording/reproducing apparatus 1 in the embodiment will be explained. FIG. 23 is a cross sectional view conceptually showing the information reproduction operation.

The nonlinear dielectric constant of a dielectric substance changes in accordance with the polarization direction of the dielectric substance. The nonlinear dielectric constant of the dielectric substance can be detected as a difference in the capacitance of the dielectric substance or a difference in the capacitance change, when an electric field is applied to the dielectric substance. Therefore, by applying an electric field to the dielectric material and by detecting a difference in the capacitance Cs or a difference in the change of the capacitance Cs in a certain domain of the dielectric material at that time, it is possible to read and reproduce the data recorded as the polarization direction of the dielectric material.

Specifically, firstly, as shown in FIG. 23, an alternating electric field from the not-illustrated AC signal generator 21 is applied between the electrode 16 and the probe 100 (i.e. the electrode 120 provided for the probe 100). The alternating electric field has an electric field strength which does not exceed the coercive electric field of the dielectric material 17, and has a frequency of approximately 5 kHz, for example. The alternating electric field is generated mainly to discriminate the difference in the capacitance change corresponding to the polarization direction of the dielectric material 17. Incidentally, instead of the alternating electric field, a direct current bias voltage may be applied to form an electric field in the dielectric material 17. The application of the alternating electric field causes the generation of an electric field in the dielectric material 17 of the dielectric recording medium 20.

Then, the probe 100 is put closer to a recording surface until the distance between the tip of the electrode 120 and the recording surface becomes extremely small on the order of nanometers. Under this condition, the oscillator 13 is driven. Incidentally, in order to detect the capacitance Cs of the dielectric material 17 under the probe 100 highly accurately, it is preferable to contact the probe 100 with the surface of the dielectric material 17, i.e. the recording surface. However, even if the tip of the electrode 120 is not contacted with the recording surface, for example, even if the tip of the electrode 120 is put closer to the recording surface to the extent that can be substantially regarded as the contact, the reproduction operation can be performed.

Then, the oscillator 13 oscillates at the resonance frequency of the resonance circuit, which includes the inductor L and the capacitance Cs associated with the dielectric material 17 under the electrode 120, as the constituent factors. The center frequency of the resonance frequency is set to approximately 1 GHz, as described above.

Here, the return electrode 12 and the probe 100 constitute one portion of the oscillation circuit 14 including the oscillator 13. The high-frequency signal of approximately 1 GHz, which is applied to the dielectric material 17 from the probe 100, passes through the dielectric material 17 and returns to the return electrode 12, as shown by solid lines in FIG. 23. By disposing the return electrode 12 in the vicinity of the probe 100 and shortening a feedback route to the oscillation circuit including the oscillator 13, it is possible to reduce noise (e.g. a floating capacitance component) entering the oscillation circuit.

In addition, the change of the capacitance Cs corresponding to the nonlinear dielectric constant of the dielectric material 17 is extremely small, and in order to detect this change, it is necessary to adopt a detection method having high detection accuracy. In a detection method using FM modulation, the high detection accuracy can be generally obtained, but it is necessary to further improve the detection accuracy, in order to make it possible to detect the small capacitance change corresponding to the nonlinear dielectric constant of the dielectric material 17. Thus, in the dielectric recording/reproducing apparatus in the embodiment (i.e. recording/reproducing apparatus which uses the SNDM principle), the return electrode 12 is located in the vicinity of the probe 100 to shorten the feedback route to the oscillation circuit as much as possible. By this, it is possible to obtain extremely high detection accuracy, and thus it is possible to detect the small capacitance change corresponding to the nonlinear dielectric constant of the dielectric substance.

After the oscillator 13 is driven, the probe 100 is displaced in parallel with the recording surface on the dielectric recording medium 20. By the displacement, the domain of the dielectric material 17 under the probe 100 is changed, and whenever the polarization direction thereof changes, the capacitance Cs changes. If the capacitance Cs changes, the resonance frequency, i.e. the oscillation frequency of the oscillator 13, changes. As a result, the oscillator 13 outputs a signal which is FM-modulated on the basis of the change of the capacitance Cs.

This FM signal is frequency-voltage converted by the demodulator 30. As a result, the change of the capacitance Cs is converted to the extent of a voltage. The change of the capacitance Cs corresponds to the nonlinear dielectric constant of the dielectric material 17. The nonlinear dielectric constant corresponds to the polarization direction of the dielectric material 17. The polarization direction corresponds to the data recorded in the dielectric material 17. Therefore, a signal obtained from the demodulator 30 is a signal in which a voltage changes correspondingly to the data recorded in the dielectric recording medium 20. Moreover, the signal obtained from the demodulator 30 is supplied to the signal detector 34, and the data recorded in the dielectric recording medium 20 is extracted by the coherent detection or synchronized detection, for example.

At this time, in the signal detector 34, an AC signal generated by the AC signal generator 21 is used as a reference signal. This makes it possible to extract the data highly accurately by synchronizing it with the reference signal, as described later, even if the signal obtained from the demodulator 30 includes much noise or even if the data to be extracted is weak, for example.

Particularly in the embodiment, the above-mentioned probe 100 or the like in the embodiment is used as the probe, so that it is possible to increase the physical contact area and reduce the electrical contact area between the probe 100 and the dielectric recording medium 20. Therefore, the ablation of the probe 100 does not proceed, as described above, which increases the operational lifetime of the probe 100. By using such a probe 100, it is possible to preferably perform the reproduction operation.

Incidentally, in the above-mentioned embodiment, the specific method of driving the dielectric recording medium 20 and the probe 100 is not described in detail; however, various driving methods can be adopted. For example, the dielectric recording medium 20 or the probe 100 may be driven, by providing at least one of the dielectric recording medium 20 and the probe 100 for an x-y scanner or the like, which can arbitrarily displace it along two axes crossing at right angles (e.g. along the recording surface of the dielectric recording medium 20). In this driving method, if a displacement amount in the x-axis direction and a displacement amount in the y-axis direction are controlled in accordance with the position of the recording area on the dielectric recording medium 20 in which the data is to be recorded or the data to be reproduced is recorded, it is possible to perform the data recording operation and reproduction operation, relatively easily. Moreover, the dielectric recording medium 20 or the probe 100 may be driven in the z-axis direction (e.g. a direction perpendicular to the recording surface of the dielectric recording medium 20), in addition to the two axes of the x axis and the y axis, in order to adjust the distance between the dielectric recording medium 20 and the probe 100.

Alternatively, the dielectric recording medium 20 in a circular shape may be rotated by a spindle motor or the like, for example. In this case, for example, as in a CLV (Constant Linear Velocity) recording method for the optical disc, it is possible to set the relative linear velocity of the dielectric recording medium 20, to be constant with respect to the probe 100. Thus, it is possible to generate a flow of air between the dielectric recording medium 20 and the probe 100, so that it is possible to construct the probe as a floating type recording/reproducing head (flying head) in which the probe 100 floats above the recording surface of the dielectric recording medium 20 by a small amount. At this time, in a steady state (i.e. in the state that the probe 100 floats), the ablation of the probe 100 does not progress; however, depending on waviness (or tilt) of the dielectric recording medium 20 or force acting on the probe 100, it can be also sufficiently considered that the dielectric recording medium 20 and the probe 100 come in contact. Even in the case where such an unexpected contact occurs, according to the probe 100 in the embodiment, there is such a great advantage that it is possible to inhibit or prevent the progress of the ablation of the probe 100, as described above.

Alternatively, not only in this case, but if the data can be properly recorded into the dielectric recording medium 20 and the data recorded in the dielectric recording medium 20 can be properly reproduced, various driving methods used in various recording/reproducing apparatuses can be adopted. Moreover, it is obvious that the shape, structure, and function, or the like of the dielectric recording medium 20 and the probe 100 may be also changed in accordance with the adopted driving method, as occasion demands, as long as having the above-mentioned characteristics of the present invention.

Moreover, in the above-mentioned embodiment, the dielectric material 17 is used for the recording layer. However, from the viewpoint of the presence/absence of the non-linear dielectric constant and spontaneous polarization, the dielectric material 17 is preferably a ferroelectric substance.

Incidentally, the probe 100 or the like in the embodiment described above may be used not only for the recording/reproducing apparatus related to the SNDM, explained in the embodiment, but also for a scanning capacitance microscope, such as SCaM, or a recording/reproducing apparatus, or an apparatus for generation various devices, such as a SHG (Sub Harmonic Generation device, for example.

Moreover, in the present invention, various changes may be made, if desired, without departing from the essence or spirit of the invention which can be read from the claims and the entire specification. A probe, a recording apparatus, a reproducing apparatus, and a recording/reproducing apparatus, which involve such changes, are also intended to be within the technical scope of the present invention.

INDUSTRIAL APPLICABILITY

The probe, the recording apparatus, the reproducing apparatus, and the recording/reproducing apparatus of the present invention can be applied to a probe for recording and reproducing polarization information recorded in a dielectric substance, such as a ferroelectric recording medium, and a recording apparatus, a reproducing apparatus, and a recording/reproducing apparatus for recording and reproducing the polarization information recorded in the dielectric substance, such as a ferroelectric recording medium, for example.

The invention claimed is:

1. A probe comprising:
a substrate having a surface facing a medium; and
a point electrode, formed in said substrate, for performing at least one of detection operation of a state of a domain of the medium and change operation of the state of the domain of the medium,
a tip portion, which is an edge portion on a side facing the medium, out of said point electrode being disposed in one point in a plane which is formed in a vicinity of an area portion, in which said point electrode is formed, by the surface.

2. The probe according to claim 1, wherein said point electrode is formed in said substrate, continuously up to a predetermined height from the medium.

3. The probe according to claim 1, wherein a height of the surface from the medium is equal to a height of the tip portion from the medium.

4. The probe according to claim 1, wherein said substrate includes at least one of an insulator and a high-resistance member.

5. The probe according to claim 1, wherein the surface is a plane along the medium.

6. The probe according to claim 1, wherein said point electrode is formed in a hole provided in said substrate.

7. The probe according to claim 6, wherein said point electrode is formed at least by covering a side surface of the hole with a metal film.

8. The probe according to claim 6, wherein said point electrode is formed at least by covering a side surface of the hole with a member having electric conductivity.

9. The probe according to claim 6, wherein said point electrode is formed at least by forming a member including a carbon nano material in the hole.

10. The probe according to claim 6, wherein a preliminary hole with a predetermined first diameter is provided in said substrate, and the hole with a second diameter, which is smaller than the first diameter, is provided at least by oxidizing a side surface of the preliminary hole.

11. The probe according to claim 10, wherein a depression is formed in at least one portion of a back surface, which is on an opposite side to the surface, out of said substrate, and the preliminary hole is provided after a surface of the depression is oxidized.

12. The probe according to claim 1, wherein the tip portion of said point electrode is in contact with a surrounding member of said substrate, which forms the area portion, on the surface.

13. The probe according to claim 1, wherein said point electrode performs at least one of the detection operation of the state of the domain and the change operation of the state of the domain, on the basis of a change in at least one of a voltage applied to and an electric current supplied to said point electrode.

14. A probe comprising:
a substrate having a surface facing a medium; and
a plurality of point electrodes, formed in said substrate, each of which performs at least one of detection operation of a state of a domain of the medium and change operation of the state of the domain of the medium,
a tip portion, which is an edge portion on a side facing the medium, of at least one of said point electrodes being disposed in one point in a plane which is formed in a vicinity of an area portion, in which the at least one of said point electrodes is formed, by the surface.

15. A recording apparatus for recording data into a dielectric recording medium, said recording apparatus comprising:
the probe according to claim 1; and
a record signal generating device for generating a record signal corresponding to the data.

16. A recording apparatus for recording data into a dielectric recording medium, said recording apparatus comprising:
the probe according to claim 14; and
a record signal generating device for generating a record signal corresponding to the data.

17. A reproducing apparatus for reproducing data recorded in a dielectric recording medium, said reproducing apparatus comprising:
- the probe according to claim 1;
- an electric field applying device for applying an electric field to the dielectric recording medium;
- an oscillating device in which an oscillation frequency is changed in accordance with a difference in capacitance corresponding to a non-linear dielectric constant of the dielectric recording medium; and
- a reproducing device for demodulating and reproducing an oscillation signal from said oscillating device.

18. A reproducing apparatus for reproducing data recorded in a dielectric recording medium, said reproducing apparatus comprising:
- the probe according to claim 14;
- an electric field applying device for applying an electric field to the dielectric recording medium;
- an oscillating device in which an oscillation frequency is changed in accordance with a difference in capacitance corresponding to a non-linear dielectric constant of the dielectric recording medium; and
- a reproducing device for demodulating and reproducing an oscillation signal from said oscillating device.

19. A recording/reproducing apparatus for recording data into a dielectric recording medium and for reproducing the data recorded in the dielectric recording medium, said recording/reproducing apparatus comprising:
- the probe according to claim 1;
- a record signal generating device for generating a record signal corresponding to the data;
- an electric field applying device for applying an electric field to the dielectric recording medium;
- an oscillating device in which an oscillation frequency is changed in accordance with a difference in capacitance corresponding to a non-linear dielectric constant of the dielectric recording medium; and
- a reproducing device for demodulating and reproducing an oscillation signal from said oscillating device.

20. A recording/reproducing apparatus for recording data into a dielectric recording medium and for reproducing the data recorded in the dielectric recording medium, said recording/reproducing apparatus comprising:
- the probe according to claim 14;
- a record signal generating device for generating a record signal corresponding to the data;
- an electric field applying device for applying an electric field to the dielectric recording medium;
- an oscillating device in which an oscillation frequency is changed in accordance with a difference in capacitance corresponding to a non-linear dielectric constant of the dielectric recording medium; and
- a reproducing device for demodulating and reproducing an oscillation signal from said oscillating device.

* * * * *